Patented Feb. 20, 1934

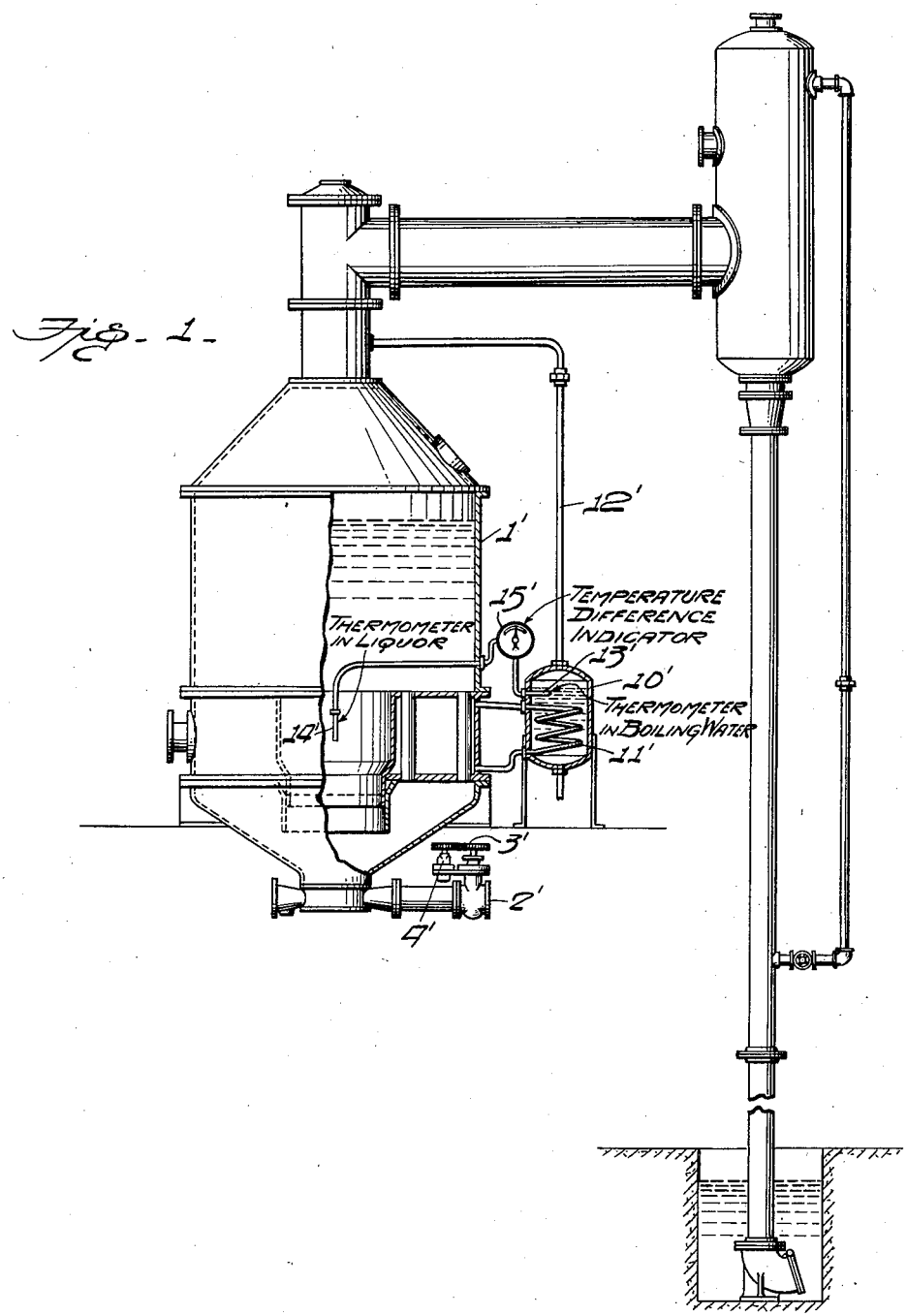

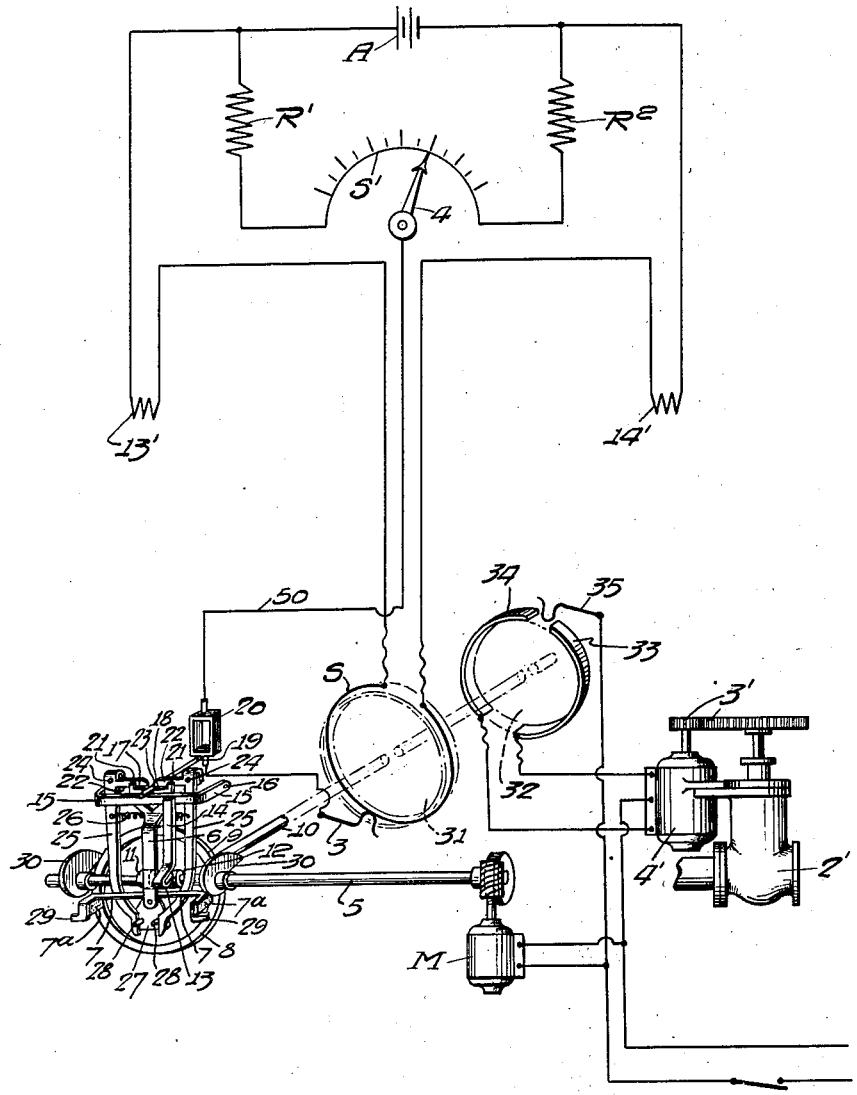

1,948,052

UNITED STATES PATENT OFFICE 1,948,052

SYSTEM OF VACUUM PAN CONTROL

Walter E. Smith, Honolulu, Territory of Hawaii

Application September 15, 1932
Serial No. 633,373

5 Claims. (Cl. 159—45)

The invention relates to a system of controlling the boiling of sugar juices or massecuites in vacuum pans by estimating or determining the concentration from the boiling point elevation, that is, the difference between the temperature at which water boils under the same pressure or degree of vacuum as that existing in the vacuum pan and the temperature of the liquor in the vacuum pan, and, to this end, comprises a water boiler in which pressure identical with that in the vacuum pan is maintained and an electric system for indicating and/or controlling the boiling point elevation, involving electric resistance therometers located in the vacuum pan and in the water boiler, respectively, which thermometers are so connected with a temperature difference indicator as to cause the latter to show the true boiling point temperature difference with exceptional accuracy, so that the concentration of the massecuites may be effected either by manual or automatic control of the supply of liquor to the vacuum pan to maintain optimum conditions of operation.

The invention is illustrated in the accompanying drawings in which:—

Figure 1 is an elevation, partly in section, of a vacuum pan associated with the control apparatus.

Fig. 2 is a view, partly in diagram and partly in perspective, illustrating a known type of controller and associated circuits for indicating and maintaining the desired temperature difference between the boiling liquor in the vacuum pan and the boiling water.

Referring to the drawings, 1' indicates the vacuum pan which may be of any of the standard forms, 2' the supply valve controlling admission of the liquor to the vacuum pan, which valve may be operated either manually, or by mechanical means, such as an electric motor 4' connected by suitable gears 3' to the valve stem, the motor being associated with a special control mechanism to be hereinafter referred to.

Associated with the vacuum pan is a water boiler 10', which may comprise a relatively small tank provided with means for maintaining a supply of water therein and connected to the upper portion of the vacuum pan by pipe 12' to maintain the same degree of vacuum in the water boiler as that in the vacuum pan. Any suitable means for boiling the water in the tank 12' may be provided, that indicated consisting of a heating coil 11' submerged within the water in the boiler and connected, to maintain circulation of steam through the coil, with the steam space of the calandria of the vacuum pan.

Located within the boiling liquor in the vacuum pan at a point to indicate the true boiling temperature of the contents of the pan is an electric resistance thermometer 14', and a similar electric resistance thermometer 13' is located either in the water or in the vapor space above the boiling water in the tank or boiling pot 10', said electric thermometers being included in an electric circuit with an electric indicator or controller 15', which will indicate the temperature difference between the boiling point of the water and the boiling point of the liquor and, therefore, indicate the true boiling point elevation of the liquor.

The instrument 15 may be a simple indicating galvanometer, or it may be an instrument which indicates and/or records temperature differences, or an instrument that indicates and/or controls temperature differences, the controlling operation involving the actuation of valve 2' by suitable mechanism associated with and controlled by the galvanometer to control and regulate the admission of liquor to the vacuum pan. For example, the galvanometer may be associated with a suitable network or system of control similar to that illustrated in the patent to Wunsch No. 1,751,539, March 25, 1930, the automatic electric system or network operating to regulate the supply of liquor to the vacuum pan to maintain the boiling point elevation of the liquor in the pan substantially constant or within a very small range of variation in the temperature.

Fig. 2 of the drawings illustrates sufficient of the apparatus, as shown in said patent, to exemplify the operation of the same in indicating and controlling the boiling point elevation of the liquor in the vacuum pan.

The electrical system associated with the controller is a Wheatstone bridge, in which the electrical resistance theremometers 13' and 14' are connected in series with the slide wire resistance S and battery A, forming two arms of the Wheatstone bridge, the other two arms of which are constituted by the fixed resistances R' and R² connected to battery A and in series with the slide wire resistance S', the galvanometer 20 being connected between the contacts 3 and 4 engaging the slide wires S and S', the contact 4 being adjusted by hand to the temperature difference between the boiling sugar juice and the boiling water.

Referring to Fig. 2, M is an electric motor or other suitable source of power rotating the shaft 5 at substantially constant speed. A lever 6 is pivoted at its upper end on a horizontal axis and has pivoted thereto on a horizontal axis at its lower end the arm 7, on each end of which is a shoe 7ª, of cork or the like, frictionally engaging the rim 8 of the clutch disk or wheel 9, secured upon the shaft 10 of the movable structure or system. Secured upon the shaft 5 is a cam 11, which periodically engages the lever 6 and moves it outwardly, in opposition to a spring, not shown, thereby lifting the shoes 7ª from the rim 8, the spring returning the shoes into engagement with the rim after predetermined rotation of the cam 11. Upon the shaft 5 is secured a second cam 12, which, after the shoes 7ª have been lifted from the rim by the cam 11, actuates the finger 13 on the lower end of the arm 14 secured at its upper end to the member 15 pivoted on a horizontal axis at 16. Upon the member 15 is secured the member 17, whose upper edge 18 is inclined outwardly from the center. Disposed immediately above the edge 18 is the needle or pointer 19 of the galvanometer whose coil is 20. At the opposite ends of the member 17 are the abutments 21 for limiting the deflection of the needle 19. Directly above the needle 19 and beneath which it normally freely swings are the edges 22, preferably straight and horizontal, upon the members 23, 23 pivoted at 24, 24, and extending toward each other, leaving a gap of sufficient width between their inner ends for free entry of the needle 19 when in balanced or zero position, corresponding with a balance of the Wheatstone bridge of the character shown. The needle 19 normally swings freely between the edge 18 and the members 23, 23, which latter have downwardly extending arms 25, 25, biased toward each other by the spring 26. Attached to the lower end of the arm or lever 6 is a triangular plate 27 carrying the pins 28, 28, cooperating with the lower ends of the members 25, 25. At opposite ends of the arm 7 are the lugs 29, 29, adapted to be engaged by the cams 30, 30, similar in shape and similarly positioned and secured upon the shaft 5.

As the galvanometer needle 19 deflects in the one direction or the other, the shaft 10 will be rotated in the one direction or the other, and to an extent corresponding to the extent of the galvanometer deflection. For example, when the needle 19 deflects to the right, due to periodic vertical movement of member 15 by cam 12, the needle 19 is clamped between the inclined edge 18 and lower edge 22 of the right hand member 23 causing the arm 25 to be tilted in a clockwise direction about its pivot 24, thereby pushing the right hand pin 28 on plate 27, and so tilting the movable or driving clutch or arm 6 in a clockwise direction while cam 11 is holding shoes 7, 7 from the rim 8 of clutch wheel 9, the angular movement of the member 6 being dependent upon the degree of deflection of needle 19. The cam 11 soon thereafter allows the shoes to again grip the rim 8 of wheel 9 and soon thereafter the left hand cam 30 engages the ear 29, which has been elevated, pushing it downwardly due to rotation of shaft 5, to restore it to the horizontal position indicated; but, in so moving back to normal position, the clutch member rotates the disk 9 and shaft 10 affixed thereto in a counterclockwise direction.

Secured upon the shaft 10 is a disk 31 of insulating material, carrying upon its periphery resistance S, which is rotated, while its coacting contact 3 is stationary. Secured upon the shaft 10 is a second disk 32 carrying the arcuate contacts 33 and 34, with which coacts the stationary contact or brush 35 constituting a reversing switch for the valve actuating motor 4'.

In the operation of this system, the boiling of the liquor in the vacuum pan is first conducted in the ordinary manner and the boiling point elevation observed at different conditions of density, or at such time as graining, shock-seeding or discharge. By observing the boiling point elevation as indicated by the galvanometer, similar conditions of density may be duplicated with sufficient accuracy by maintaining the same boiling point elevation. The boiling point elevation for varying conditions, such as those occurring when working with sugar liquors of different composition, will not always be the same, but will differ with the different types of materials employed. By boiling a series of batches, the appropriate boiling point elevation may be determined and the data obtained then becomes the basis or control for future operations, when working with similar materials.

In the application of the automatic control system to a continuous regulated feed, as exemplified in Fig. 2, the contact 4 engaging slide wire S' is manually adjusted to the desired temperature difference between the boiling liquor and the boiling water, as indicated on a scale associated therewith. Any change in the boiling temperature of the liquor will be evidenced by the electrical resistance thermometer 14' in the vacuum pan and will produce an unbalancing of the Wheatstone bridge, and the galvanometer will be deflected through an angle proportional to the unbalance in the Wheatstone bridge circuit and the direction of the deflection corresponds to the direction of unbalance. The deflection of the galvanometer needle 19 causes a commensurate rotation of shaft 10 and disks 31 and 32. The rotation of disk 31 moves the slide wire S under the contact 3 an amount equal to the unbalance and restores the balance of the bridge circuit. The partial rotation of disk 32 closes the circuit of the motor 4' to effect an opening or closing movement of said valve to regulate the admission of thin liquor to the vacuum pan. As the cycle of operations of the electromechanical controller requires only one or two seconds and is repeated continuously, whenever the Wheatstone bridge is unbalanced, due to a change in the boiling point of the liquor, the balance is quickly restored and in the restoration of the balance the supply of thin liquor by the valve 2' is adjusted to restore the boiling point elevation of the liquor.

The technique of the operation known as sugar boiling, consisting of the crystallization of sugar from sugar-containing solutions is controlled primarily by varying the density of the mother liquor and this is accomplished by controlling the amount of thin liquor admitted to the pan.

The efficacy of the system is largely dependent upon the use of the electric resistance thermometers in the relation indicated, as the latter have a constant relation for resistance and temperature and indicate true temperatures regardless of the position of such temperatures in the absolute scale, therefore such thermometers constitute accurate and sensitive means for measuring temperature differences. The use of a container in which water is maintained at the boiling point under a pressure equal to that existing in the vacuum pan provides a convenient reference point from which the boiling point elevation of the liquor in the pan may be obtained by the actual measurement indicated on the scale of the galvanometer and determined by the electric resistance thermometers, independently of any change in the existing absolute pressure.

Control of boiling operations by observation of boiling point elevation permits a definite control which is not possible with the usual method of control, in which the density of the material within the vacuum pan is merely estimated by the operator by the observation of samples taken from the massecuite within the pan. Under the conventional system of control, the estimation of density is entirely a matter of judgment on the part of the operator, based on experience and such control is not capable of definite expression or measurement.

The use of indicating equipment for producing a record of temperature differences makes possible the establishment of a record which may be used for supervision of control, that is to say, it makes possible a definite prescription of density conditions which are to be maintained, the record serving to show whether the prescribed conditions and instructions have been actually followed.

The use of a controlling system actuated by variations in temperature differences, makes possible an automatic control of boiling which has heretofore not been attainable. It insures uniformity of operation and the exact duplication of optimum conditions and removes the operation of sugar boiling from the field of haphazard control by or through mere personal knowledge to that of exact control either by manual or automatic means.

What I claim is:

1. A system of vacuum pan control, comprising a water boiler in which a pressure identical to that in the vacuum pan is maintained, electric resistance thermometers located in the vacuum pan and the water boiler respectively, and a temperature difference indicating device so connected in circuit with said thermometers as to indicate the boiling point elevation of the liquor in the vacuum pan.

2. A system as described in claim 1, in which the indicating device involves an automatic controller to regulate the supply of liquor to the vacuum pan.

3. A system of vacuum pan control, comprising a water boiler in which a pressure identical with that in the vacuum pan is maintained, electric resistance thermometers located in the vacuum pan and the water boiler respectively, a temperature difference indicating controller device, and means actuated by said controller for regulating the supply of liquor to the vacuum pan.

4. Apparatus for effecting and regulating the boiling point of liquor under vacuum in combination with a water boiler in which the same pressure as that in the liquor boiler is maintained, electric resistance thermometers within the respective boilers, a temperature difference indicator and controller in circuit with and responsive to the action of said thermometers, and a motor actuated valve for regulating the supply of liquor to the liquor boiler in response to the action of said controller.

5. The combination of a vacuum pan, a motor operated valve for regulating the supply of liquor thereto, a water boiler in which the same pressure as that in the vacuum pan is maintained, electric resistance thermometers in the vacuum pan and boiler, and a temperature difference indicating controller in circuit with and responsive to the action of said thermometers, said controller including means to regulate the operation of the supply valve.

WALTER E. SMITH.